Patented May 24, 1927.

1,629,894

UNITED STATES PATENT OFFICE.

RICHARD TOBLER, OF BASEL, SWITZERLAND, ASSIGNOR TO SOCIETY OF CHEMICAL INDUSTRY OF BASLE, OF BASEL, SWITZERLAND.

PROCESS FOR THE MANUFACTURE OF 2:3-AMINONAPHTHOIC ACID.

No Drawing. Application filed March 26, 1926, Serial No. 97,768, and in Switzerland April 8, 1925.

Until lately the 2:3-aminonaphthoic acid corresponding with the formula

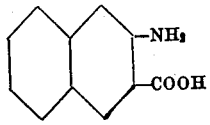

has been made by heating the 2:3-hydroxynaphthoic acid with aqueous ammonia under increased pressure. This process leads to bad yields, with formation of considerable quantities of β-naphthol and β-naphthylamine as by-products (c.f. Berichte der deutschen Chemischen Gesellschaft No. 28, 3096).

Since, it has also been recommended to carry out the amination in a dry process. By this method better yields are obtained (cf. Helv. Chimica Acta V 1922 p. 558). The practical realization of the process, however, offers certain difficulties as to the device employed, hard lumps being very easily formed.

It has now been found that the amination may be much simplified, improving further the yields of the dry process, by heating the 2:3-hydroxynaphthoic acid in a closed vessel with an excess of aqueous ammonia in the presence of a salt of a bivalent metal which salt is soluble in water in presence of an excess of ammonia, such as zinc chloride or calcium chloride.

Example 1.

250 parts of zinc chloride are dissolved in 300 parts of water, the solution is then introduced into an autoclave provided with a stirrer and treated with 500 parts of 2:3-hydroxynaphthoic acid. The autoclave is then closed and 120 to 140 parts of gaseous ammonia are introduced into it. The whole is heated for 24 hours at 220°–230° (temperature of the oil bath) which operation produces a pressure of 12 to 20 atm. The reaction mixture forms a rather thick yellow mass which is boiled with 4000 parts of water and 1400 parts of concentrated hydrochloric acid whereby almost complete solution occurs. The hot solution is filtered, the filtrate treated with 1200–1500 parts of common salt and allowed to cool whereby the 2:3-aminonaphthoic acid hydrochloride separates as colorless crystals. The latter are filtered, washed with a saturated salt solution, dissolved in 7000 parts of a solution of sodium carbonate of 8% strength, and filtered. The free 2:3-aminonapthhoic acid may be precipitated from the soda alkaline filtrate by addition of acid, or the solution may be worked up directly. Yield above 80% of the theory.

Example 2.

250 parts of zinc chloride are dissolved in 531 parts of an aqueous solution of ammonia of 24.7% strength. This solution is introduced into an autoclave together with 500 parts of 2:3-hydroxynaphthoic acid. The autoclave is closed and heated, while stirring, for about 36 hours at 220–230° (temperature of the oil bath) and at a pressure of 15–20 atm. The reaction mixture forms a dilute yellow mass which is worked up as indicated in the previous example.

What I claim is:

1. A process for the manufacture of 2:3-aminonaphthoic acid, consisting in heating 2:3-hydroxynaphthoic acid in a closed vessel with an excess of aqueous ammonia in the presence of a salt of a bivalent metal which salt is soluble in water in presence of an excess of ammonia.

2. A process for the manufacture of 2:3-aminonaphthoic acid, consisting in heating 2:3-hydroxynaphthoic acid in a closed vessel with an excess of ammonia in presence of a zinc salt.

3. A process for the manufacture of 2:3-aminonaphthoic acid, consisting in heating 2:3-hydroxynaphthoic acid in a closed vessel with an excess of ammonia in presence of zinc chloride.

In witness whereof I have hereunto signed my name this 13th day of March 1926.

RICHARD TOBLER.